Figure 1:
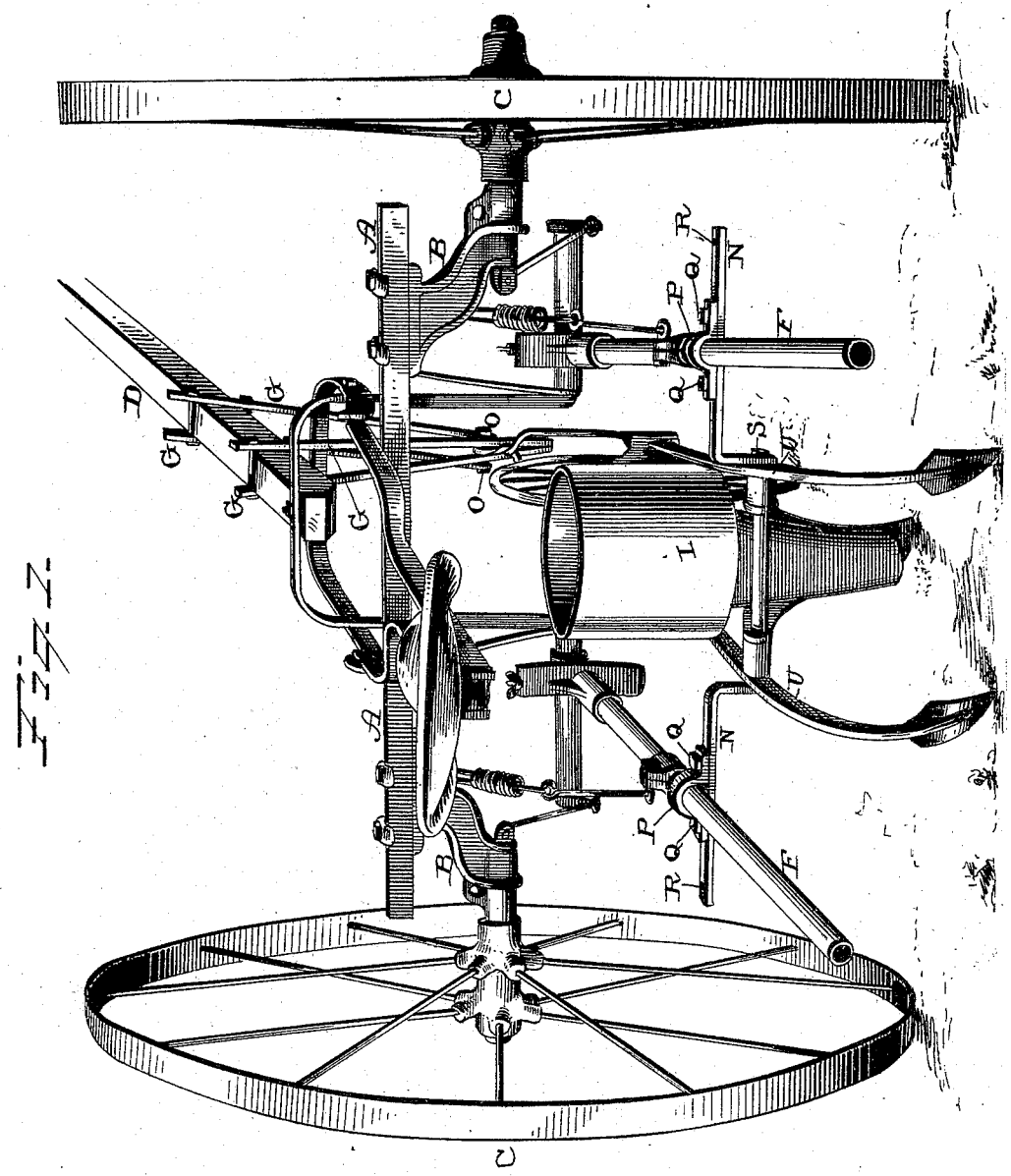

(No Model.) 3 Sheets—Sheet 1.
T. R. MORRIS.
ATTACHMENT FOR CULTIVATORS.

No. 570,492. Patented Nov. 3, 1896.

Witnesses
C. J. Williamson.
Wm. Osgood.

Inventor
Thomas R. Morris.
per Chas. H. Fowler.
Attorney.

(No Model.) 3 Sheets—Sheet 2.
T. R. MORRIS.
ATTACHMENT FOR CULTIVATORS.
No. 570,492. Patented Nov. 3, 1896.
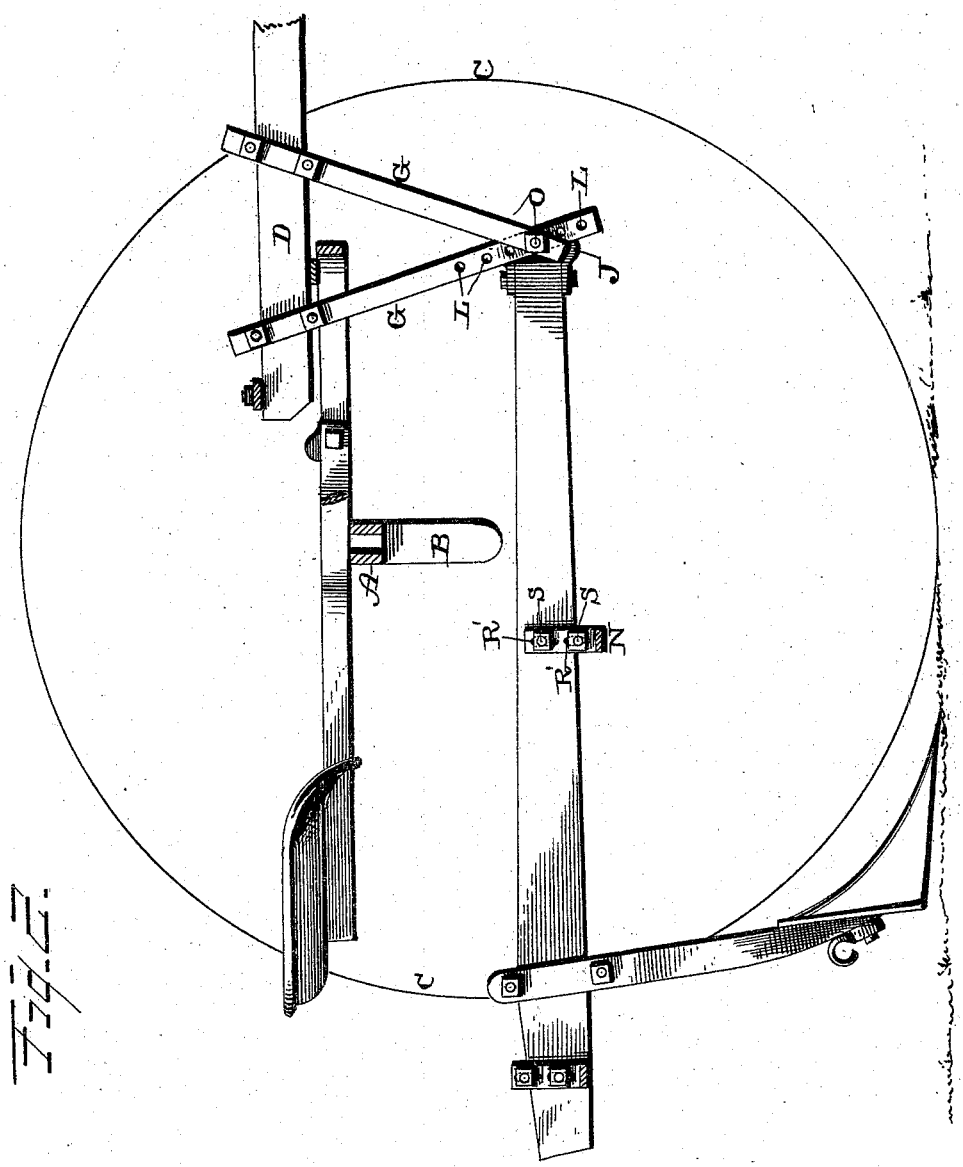

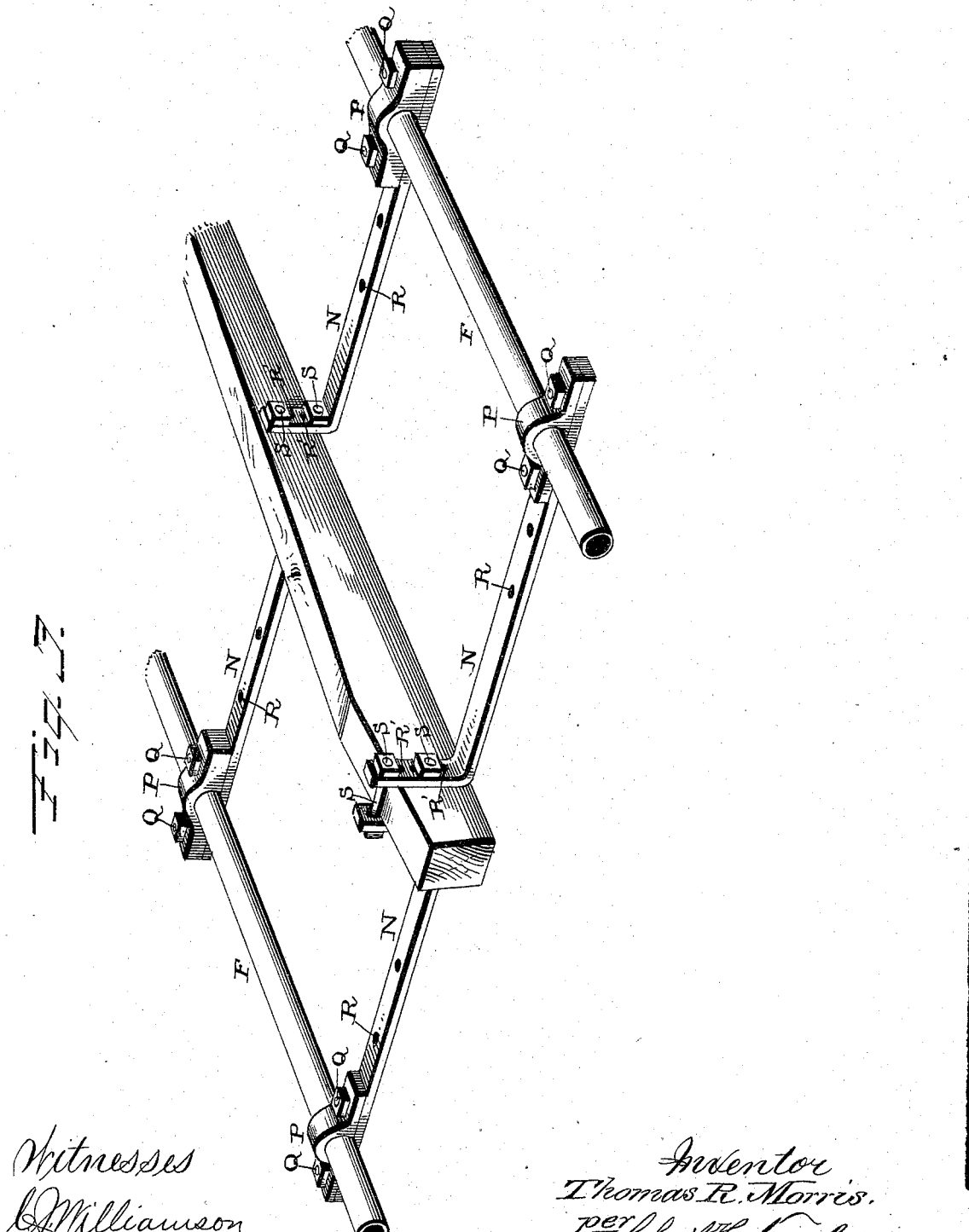

UNITED STATES PATENT OFFICE.

THOMAS R. MORRIS, OF BILLINGTON, TEXAS, ASSIGNOR OF ONE-HALF TO JORDON G. DAVIS, OF SAME PLACE.

ATTACHMENT FOR CULTIVATORS.

SPECIFICATION forming part of Letters Patent No. 570,492, dated November 3, 1896.

Application filed August 3, 1896. Serial No. 601,447. (No model.)

*To all whom it may concern:*

Be it known that I, THOMAS R. MORRIS, a citizen of the United States, residing at Billington, in the county of Limestone and State of Texas, have invented certain new and useful Improvements in Attachments for Cultivators; and I do hereby declare that the following is a full, clear, and exact description of the same, reference being had to the annexed drawings, making a part of this specification, and to the letters of reference marked thereon.

My invention relates to an improvement in devices for attaching planters or plows to wheel-cultivator frames; and it consists in rods secured at their upper ends to the tongue and at their lower ones to the front end of the planter-frame or plow-beam, combined with two braces which are secured at their inner ends to opposite sides of the planter or plow-beam and at their outer ones to the cultivator-beams, all of which will be more fully described hereinafter.

The object of my invention is to provide means whereby a planter or a plow-beam carrying any desired cultivating implement can be attached to the frame of a riding or wheel cultivator frame, and thus enable the cultivator-frame to be applied to uses other than that for which it was intended.

In the accompanying drawings, which form part of this specification, Figure 1 is a perspective of a wheel-cultivator frame to which a seed-planter is attached by means of my invention. Fig. 2 is an enlarged detail view of the same, showing the manner of attaching a plow-beam. Fig. 3 is an enlarged perspective of the same.

A represents the axle of a wheel-cultivator frame; B, the short axles, on which the wheels C are placed; D, the tongue, and F beams from which the cultivating implements have been removed. Secured to opposite sides of the tongue at any suitable point in advance of the main axle, by means of suitable clamping devices, are the four supporting brace-rods G, the lower ends of which are united in pairs and rigidly clamped to and against opposite sides of the front end of the frame or draft-rod of the seeder I, of any suitable construction, as shown in Fig. 1, or to opposite sides of the clevis J, by means of the clamping-bolt O. One or both of the rods G of each pair of them is provided with a series of perforations L, so that the bolt O can be adjusted to suit the height or length of the part that is to be secured to them, whether it is a seeder or a plow-beam. These rods G not only assist to draw the seeder or beam along, but regulate the height of the front end of the seeder or beam, so as to regulate the angle at which the furrow-opener, plow, or other attachment shall run.

While all the cultivating attachments of the beam F are removed, the beams are left in position, and to these beams the outer ends of the angular braces N are secured at any desired point by means of the caps P and bolts Q. Each brace N is provided with a series of perforations R, so that the braces can be adjusted to a wide device, like a seeder, as shown in Fig. 1, or a narrow one, like a plow-beam, as shown in Figs. 2 and 3. The inner ends of the braces are turned at right angles, and these ends are provided with slots R', so as to accommodate the clamping-bolts S.

Where the seeder is to be used, it is connected to the cultivator, as shown in Fig. 1, the braces N connecting with the braces U of the furrow-openers in any suitable and well-known manner. Where a plow-beam is used, these inner bent ends are placed directly against opposite sides of the beam, and one bolt is passed through the beam while the other is passed just above or below its edge, as may be preferred. These braces prevent any lateral movement of the planter or beam except in connection with the beams F and help to draw the implement along with the frame and to hold the implement in an upright position. To the standard of the beam may be attached a plow, a sweep, or any form of cultivating-tool that may be desired.

As will be seen, but a single set of attachments are used for both plows and seeders, the team being attached to the tongue when the seeder is used and to the front end of the beam when the plow is used. By means of these devices all strain is taken from the cultivator-frame when the plow is in use, and as the driver rides over the top of the planter he can always see whether the parts are working or not. By means of my attachments a corn or cotton cultivator will run more evenly, plant a greater quantity of seed, and run deep or shallow on even or uneven ground without jumping, and the planter or plow can move freely up and down without having any side motion.

Having thus described my invention, I claim—

1. As an attachment for a planter, plow, or other implement to a wheel-cultivator frame, supporting rods or braces secured to the tongue at their upper ends and to the implement at its front end, and lateral braces that are secured to the implement near its rear end and to the cultivator-beams, substantially as shown.

2. As an attachment to a wheel-cultivator frame, the brace-rods G, which are clamped at their upper ends to the tongue, combined with an agricultural implement, the beams, to which the lower ends of the rods are fastened, and means for preventing the implement from having a lateral movement except in connection with the cultivator-beams, substantially as described.

In testimony that I claim the above I have hereunto subscribed my name in the presence of two witnesses.

THOMAS R. MORRIS.

Witnesses:
J. H. BURNETT,
J. H. CALDWELL.